US009031895B2

(12) United States Patent
Schon

(10) Patent No.: US 9,031,895 B2
(45) Date of Patent: May 12, 2015

(54) MATCHING METADATA SOURCES USING RULES FOR CHARACTERIZING MATCHES

(75) Inventor: Andrew Schon, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 236 days.

(21) Appl. No.: 13/005,981

(22) Filed: Jan. 13, 2011

(65) Prior Publication Data

US 2011/0173149 A1 Jul. 14, 2011

Related U.S. Application Data

(60) Provisional application No. 61/294,663, filed on Jan. 13, 2010.

(51) Int. Cl.
*G06F 17/30* (2006.01)

(52) U.S. Cl.
CPC ................. *G06F 17/30507* (2013.01)

(58) Field of Classification Search
CPC .................... G06N 5/02; G06F 17/30734
See application file for complete search history.

(56) References Cited

U.S. PATENT DOCUMENTS

| | | | |
|---|---|---|---|
| 7,542,958 B1* | 6/2009 | Warren et al. ................. | 706/48 |
| 2003/0120651 A1 | 6/2003 | Bernstein et al. | |
| 2004/0158567 A1 | 8/2004 | Dettinger et al. | |
| 2004/0249682 A1 | 12/2004 | DeMarcken et al. | |
| 2005/0065921 A1 | 3/2005 | Hrle et al. | |
| 2006/0075013 A1* | 4/2006 | Hite et al. .................... | 709/201 |
| 2007/0005621 A1* | 1/2007 | Lesh et al. .................... | 707/101 |
| 2008/0021912 A1* | 1/2008 | Seligman et al. .............. | 707/101 |
| 2009/0198642 A1* | 8/2009 | Akkiraju et al. ................ | 706/54 |
| 2009/0313041 A1* | 12/2009 | Eder ................................ | 705/2 |

FOREIGN PATENT DOCUMENTS

| | | |
|---|---|---|
| CN | 1744080 A | 3/2006 |
| CN | 101650746 | 2/2010 |
| JP | 2000-040085 | 2/2000 |
| JP | 2003-271656 | 9/2003 |
| JP | 2006-039871 | 2/2006 |
| JP | 2006-163941 | 6/2006 |

(Continued)

OTHER PUBLICATIONS

Cruz et al, AgreementMaker: Efficient Matching for Large Real-World Schemas and Ontologies, Aug. 2009.*
Li, LOM: A Lexicon-based Ontology Mapping Tool, 2004.*

(Continued)

*Primary Examiner* — Jeffrey A Gaffin
*Assistant Examiner* — Mikayla Chubb
(74) *Attorney, Agent, or Firm* — Fish & Richardson P.C.

(57) ABSTRACT

Processing metadata includes storing, in a data storage system, a specification for each of multiple sources, each specification including information identifying one or more data elements of the corresponding source; and processing, in a data processing system coupled to the data storage system, data elements from the sources, including generating a set of rules for each source based on a corresponding one of the stored specifications, and matching data elements of different sources and determining a quality metric characterizing a given match between a first data element of a first source and a second data element of a second source according to the set of rules generated for the first source and the set of rules generated for the second source.

52 Claims, 13 Drawing Sheets

(56) References Cited

FOREIGN PATENT DOCUMENTS

| WO | WO 2006/116286 | 11/2006 |
|----|----|----|
| WO | 2009/017158 | 2/2009 |

OTHER PUBLICATIONS

Do et al, COMA: a system for flexible combination of schema matching approaches, 2002.*

Doan et al, Learning to match ontologies on the Semantic Web, 2003.*

Kalfoglau et al, CROSI Mapping System (CMS) Results of the 2005 Ontology Alignment Contest, 2006.*

Lambrix et al, SAMBO—A System for Aligning and Merging Biomedical Ontologies, 2006.*

Noy et al, PROMPT: Algorithm and Tool for Automated Ontology Merging and Alignment, 2000.*

Herlocker et al, Explaining Collaborative Filtering Recommendations, 2000.*

Madhavan et al, Corpus-based Schema Matching, 2005.*

International Search Report & Written Opinion issued in PCT application No. PCT/US2011/021108, dated Apr. 1, 2011, 8 pages.

"Metadata discovery," Wikipedia online file:///Metadata%20discovery%20-%20downloaded%209-3-09.htm , accessed on Sep. 3, 2009, 3 pages.

Japanese Office Action issued in Japanese Patent No. 2012-549069, issued Jun. 24, 2014, 5 pages (English Translation).

Chinese Office Action issued in Chinese Patent No. 2011-800130688, mailed Nov. 2, 2014, 15 pages.

* cited by examiner

| # | TARGET | SOURCE | SOURCE_ATTRIBUTE_NAME | NM_CANONICAL_ATTRIBUTE_NAME | MM_SIMILARITY |
|---|---|---|---|---|---|
| 1 | BEA_6 | ATL | MILESTONE · IDENTIFIER | MILESTONE · NAME | .8395110577... |
| 2 | BEA_6 | ATL | MILESTONE · IDENTIFIER | MILESTONE · IDENTIFIER | 1 |
| 3 | BEA_6 | ATL | MILESTONE · IDENTIFIER | MILESTONE · DATE | .8995557909... |
| 4 | BEA_6 | ATL | KEY · PERFORMANCE · PARAMETER · URI | PROGRAM · PERFORMANCE · PARAMETER · DIMENSION · IDENTIFIER | .4621268436... |
| 5 | BEA_6 | ATL | KEY · PERFORMANCE · PARAMETER · URI | ACQUISITION · PROGRAM · BASELINE · PERFORMANCE · PARAMETER · NAME | .4165397139... |
| 6 | BEA_6 | ATL | KEY · PERFORMANCE · PARAMETER · URI | ACQUISITION · PROGRAM · BASELINE · PERFORMANCE · PARAMETER · CAT... | .4083771164... |
| 7 | BEA_6 | ATL | KEY · PERFORMANCE · PARAMETER · ACTUAL · MEASUREMENT · DATE | PROGRAM · PERFORMANCE · PARAMETER · DIMENSION · IDENTIFIER | .4571043409... |
| 8 | BEA_6 | ATL | KEY · PERFORMANCE · PARAMETER · ACTUAL · MEASUREMENT · DATE | ACQUISITION · PROGRAM · BASELINE · PERFORMANCE · PARAMETER · NAME | .4102329311... |
| 9 | BEA_6 | ATL | KEY · PERFORMANCE · PARAMETER · ACTUAL · MEASUREMENT · DATE | ACQUISITION · PROGRAM · BASELINE · PERFORMANCE · PARAMETER · CAT... | .4021939225... |
| 10 | BEA_6 | ATL | KEY · PERFORMANCE · PARAMETER · ACTUAL · MEASUREMENT | PROGRAM · PERFORMANCE · PARAMETER · DIMENSION · IDENTIFIER | .4406992243... |
| 11 | BEA_6 | ATL | KEY · PERFORMANCE · PARAMETER · ACTUAL · MEASUREMENT | ACQUISITION · PROGRAM · BASELINE · PERFORMANCE · PARAMETER · NAME | .4136068156... |
| 12 | BEA_6 | ATL | KEY · PERFORMANCE · PARAMETER · ACTUAL · MEASUREMENT | ACQUISITION · PROGRAM · BASELINE · PERFORMANCE · PARAMETER · CAT... | .4055016917... |
| 13 | BEA_6 | ATL | SYSTEM · PHASE | PHASE · TASK · NAME | .5160325894... |
| 14 | BEA_6 | ATL | SYSTEM · PHASE | PHASE · TASK · IDENTIFIER | .5300263797... |
| 15 | BEA_6 | ATL | SYSTEM · PHASE | ACQUISITION · PROGRAM · PHASE · NAME | .5574949488... |
| 16 | BEA_6 | ATL | PROGRAM · URI | PROGRAM · RESOURCE · IDENTIFIER | .7979022796... |
| 17 | BEA_6 | ATL | PROGRAM · URI | PROGRAM · PLAN · IDENTIFIER | .4943804452... |
| 18 | BEA_6 | ATL | PROGRAM · URI | PROGRAM · IDENTIFIER | .5642681677... |
| 19 | BEA_6 | ATL | CONTRACT · EFFORT · NAME | CONTRACT · TYPE · CODE | .7167656693... |
| 20 | BEA_6 | ATL | CONTRACT · EFFORT · NAME | CONTRACT · IDENTIFIER | .7424746381... |
| 21 | BEA_6 | ATL | CONTRACT · EFFORT · NAME | ACQUISITION · PROGRAM · NAME | .7411930088... |
| 22 | BEA_6 | ATL | ORIGINAL · QUANTITY | SHIPMENT · ORIGIN · IDENTIFIER | .6484262431... |
| 23 | BEA_6 | ATL | ORIGINAL · QUANTITY | ORIGINAL · CONSTRUCTION · IDENTIFIER | .5760806298... |
| 24 | BEA_6 | ATL | ORIGINAL · QUANTITY | COLLECTION · ORIGINATOR · NAME | .6012578877... |
| 25 | BEA_6 | ATL | CONTRACT · EFFORT · NAME | CONTRACT · TYPE · CODE | .7167656693... |

FIG. 5

| | | | | |
|---|---|---|---|---|
| 26 | BEA_6 | ATL | CONTRACT-EFFORT-NAME | CONTRACT-IDENTIFIER | 7424746381... |
| 27 | BEA_6 | ATL | CONTRACT-EFFORT-NAME | ACQUISITION-PROGRAM-NAME | 7411930088... |
| 28 | BEA_6 | ATL | PROGRAM-COMPLETION-YEAR | PROJECT-COMPLETION-DATE | 7839577732... |
| 29 | BEA_6 | ATL | PROGRAM-COMPLETION-YEAR | PROGRAM-PLAN-YEAR-CODE | 6768619879... |
| 30 | BEA_6 | ATL | PROGRAM-COMPLETION-YEAR | FYDP-PROJECT-COMPLETION-DATE | 7037886848... |
| 31 | BEA_6 | ATL | ORIGINAL-QUANTITY | SHIPMENT-ORIGIN-IDENTIFIER | 6484262431... |
| 32 | BEA_6 | ATL | ORIGINAL-QUANTITY | ORIGINAL-CONSTRUCTION-IDENTIFIER | 5760806298... |
| 33 | BEA_6 | ATL | ORIGINAL-QUANTITY | COLLECTION-ORIGINATOR-NAME | 6012578877... |
| 34 | BEA_6 | ATL | PROGRAM-COMPLETION-YEAR | PROJECT-COMPLETION-DATE | 7839577732... |
| 35 | BEA_6 | ATL | PROGRAM-COMPLETION-YEAR | PROGRAM-PLAN-YEAR-CODE | 6768619879... |
| 36 | BEA_6 | ATL | PROGRAM-COMPLETION-YEAR | FYDP-PROJECT-COMPLETION-DATE | 7037886848... |
| 37 | BEA_6 | ATL | PROGRAM-COMPLETION-YEAR | PROJECT-COMPLETION-DATE | 7839577732... |
| 38 | BEA_6 | ATL | PROGRAM-COMPLETION-YEAR | PROGRAM-PLAN-YEAR-CODE | 6768619879... |
| 39 | BEA_6 | ATL | PROGRAM-COMPLETION-YEAR | FYDP-PROJECT-COMPLETION-DATE | 7037886848... |
| 40 | BEA_6 | ATL | MILESTONE-IDENTIFIER | MILESTONE-NAME | 8395110577... |

READY. SCANNED 117 RECORDS. 117 RECORDS IN DISPLAY. (EOF)

| RULE CASES | | | | | | | | |
|---|---|---|---|---|---|---|---|---|
| | TRIGGER NAME SIMILARITY | TRIGGER DESCRIPTION SIMILARITY | TRIGGER SAME NAMES | TRIGGER SAME CLASS WORDS | OUTPUT CANONICAL ATTRIBUTE NAME | OUTPUT CANONICAL ATTRIBUTE DESC | OUTPUT MATCH GRADE | OUTPUT CANONICAL CLASS WORD | OUTPUT SIMILARITY |
| 1 | >.95 | >.70 | TRUE | TRUE | NM CANONICAL ATTRIBUTE NAME | NM CANONICAL ATTRIBUTE DESC | "AA" | NM CANONICAL CLASS WORD | NAME SIMILARITY |
| 2 | >.95 | >.70 | | TRUE | NM CANONICAL ATTRIBUTE NAME | NM CANONICAL ATTRIBUTE DESC | "AB" | NM CANONICAL CLASS WORD | NAME SIMILARITY |
| 3 | >.95 | >.55 | TRUE | TRUE | NM CANONICAL ATTRIBUTE NAME | NM CANONICAL ATTRIBUTE DESC | "AB" | NM CANONICAL CLASS WORD | NAME SIMILARITY |
| 4 | >.80 | >.95 | | TRUE | DS CANONICAL ATTRIBUTE NAME | DS CANONICAL ATTRIBUTE DESC | "AC" | DS CANONICAL CLASS WORD | DESCRIPTION SIMILARITY |
| 5 | >.73 | >.40 | | TRUE | CANONICAL ATTR WITH HIGHEST SIMILARITY | CANONICAL ATTR DESC WITH HIGHEST SIMILARITY | "BA" | CANONICAL CLASS WORD WITH HIGHEST SIMILARITY | HIGHEST SIMILARITY |
| 6 | >.70 | >.25 | | TRUE | CANONICAL ATTR WITH HIGHEST SIMILARITY | CANONICAL ATTR DESC WITH HIGHEST SIMILARITY | "CA" | CANONICAL CLASS WORD WITH HIGHEST SIMILARITY | HIGHEST SIMILARITY |
| 7 | >.62 | | TRUE | | NM CANONICAL ATTRIBUTE NAME | NM CANONICAL ATTRIBUTE DESC | "BA" | CANONICAL CLASS WORD WITH HIGHEST SIMILARITY | HIGHEST SIMILARITY |
| 8 | >.62 | | | TRUE | CANONICAL ATTR WITH HIGHEST SIMILARITY | CANONICAL ATTR DESC WITH HIGHEST SIMILARITY | "CB" | CANONICAL CLASS WORD WITH HIGHEST SIMILARITY | HIGHEST SIMILARITY |
| 9 | >.70 | | | | CANONICAL ATTR WITH HIGHEST SIMILARITY | CANONICAL ATTR DESC WITH HIGHEST SIMILARITY | "CC" | CANONICAL CLASS WORD WITH HIGHEST SIMILARITY | HIGHEST SIMILARITY |
| 10 | | >.70 | | | CANONICAL ATTR WITH HIGHEST SIMILARITY | CANONICAL ATTR DESC WITH HIGHEST SIMILARITY | "CC" | CANONICAL CLASS WORD WITH HIGHEST SIMILARITY | HIGHEST SIMILARITY |
| 11 | >.39 | >.10 | | TRUE | CANONICAL ATTR WITH HIGHEST SIMILARITY | CANONICAL ATTR DESC WITH HIGHEST SIMILARITY | "CD" | CANONICAL CLASS WORD WITH HIGHEST SIMILARITY | HIGHEST SIMILARITY |
| 12 | | | | | CANONICAL ATTR WITH HIGHEST SIMILARITY | CANONICAL ATTR DESC WITH HIGHEST SIMILARITY | "F" | CANONICAL CLASS WORD WITH HIGHEST SIMILARITY | HIGHEST SIMILARITY |

| | FROM GROUP | FROM TERM | RELATIONSHIPS | TO GROUP | TO TERM |
|---|---|---|---|---|---|
| 1 | BASELINE | ACCEPTANCE DATE | MATCHES | BEA6 AV-2 | ACCEPTANCE DATE |
| 2 | BASELINE | ACCEPTANCE DATE | MATCHES | BEA7 AV-2 | ACCEPTANCE DATE |

FIG. 12

MATCHING METADATA SOURCES USING RULES FOR CHARACTERIZING MATCHES

CROSS-REFERENCE TO RELATED APPLICATIONS

This application claims priority to U.S. Application Ser. No. 61/294,663, filed on Jan. 13, 2010, incorporated herein by reference.

BACKGROUND

This description relates to matching metadata sources using rules for characterizing matches.

Metadata discovery (also known as metadata scanning) can be used to discover relationships between data elements representing metadata that describes values appearing within datasets, such as the names of fields or columns of database tables or spreadsheets. In some cases, the metadata for data appearing within a given dataset is stored in a variety of different sources. During the metadata discovery process, a match may be found between a data element in a first source and a data element in a second source. A match can correspond to similar field names and/or descriptions of metadata for fields in a table, for example. The match may indicate that the matching data elements represent metadata for the same types of data values in respective datasets. In some cases, a database of synonyms including user-specified, or dictionary-based databases, e.g. WordNet, can be used to determine matches between data elements that have similar semantic meanings (e.g., a match between "day" and "date," or between "gender" and "sex"). A master collection of metadata (sometimes called a "metadata registry") can be generated or updated to store metadata based on the discovered relationships, or to link to metadata that has been found in the metadata discovery process.

SUMMARY

In one aspect, in general, a method includes: storing, in a data storage system, a specification for each of multiple sources, each specification including information identifying one or more data elements of the corresponding source; and processing, in a data processing system coupled to the data storage system, data elements from the sources, including generating a set of rules for each source based on a corresponding one of the stored specifications, and matching data elements of different sources and determining a quality metric characterizing a given match between a first data element of a first source and a second data element of a second source according to the set of rules generated for the first source and the set of rules generated for the second source.

Aspects can include one or more of the following.

The set of rules for each source can produce one or more grades corresponding to the quality metric characterizing the given match. The method can include providing explanatory information corresponding to the one or more grades. The given match can include a match between names corresponding to the first and second data elements respectively and the one or more grades are based on the quality metric characterizing the given match. The given match can include a match between descriptions corresponding to the first and second data elements respectively and the one or more grades are based on the quality metric characterizing the given match.

The method can include classifying terms appearing in the first and second data elements into one or more classes; assigning one or more class words for each of the terms in the first and second data elements; comparing the one or more class words corresponding to terms in the first and second data elements respectively to generate the quality metric for the given match; and assigning the one or more grades based on the quality metric characterizing the given match. The quality metric characterizing the given match can include a distance measure metric. A first grade can be assigned to an output of a first rule of the set of rules and a second grade is assigned to a second, different output of a second rule of the set of rules, wherein the first grade can indicate a better quality metric characterizing the given match relative to the second grade.

The set of rules are based on a similarity of names appearing in the first and second data elements respectively. The set of rules can be based on a similarity of descriptions appearing in the first and second data elements respectively. The method can include providing a user an ability to provide input for generating one or more rules of the set of rules for quantifying a quality of a match between the first data element and the second data element. Each of the rules in the set of rules include trigger inputs and outputs based on the trigger inputs Each of the rules in the set of rules are read sequentially until all trigger inputs of a given rule in the set of rules evaluate to true. The quality metric characterizing the given match is based on a measure of a number of times a word occurs in a term of the first or second data element and the number of times a word occurs in a set of terms from the first or second source.

The method can include computing the quality metric characterizing the given match by: providing a first weight to terms that occur with a first frequency in the first or second source; and providing a second weight to terms that occur with a second frequency in the first or second source, wherein a value of the first weight is less than a value of the second weight. The method can include computing the quality metric characterizing the given match by: computing a first frequency of terms in the first source and a second frequency of terms in the second source; and producing the quality metric based on a product of numerical values of the first and second frequencies. The method can include normalizing the quality metric to range between predetermined limits (e.g., between 0 and 1).

The method can include generating a set of terms from the second source corresponding to a term in the first source and having predetermined quality metrics characterizing the match between the term and each of the set of terms. A number of terms in the set of terms is specified by a user. The match between the term and each of the set of terms is based on matching names appearing in the terms. The match between the term and each of the set of terms is based on matching descriptions appearing in the terms.

In another aspect, in general, a computer-readable medium storing a computer program, the computer program including instructions for causing a computer to: store a specification for each of multiple sources, each specification including information identifying one or more data elements of the corresponding source; generate a set of rules for each source based on a corresponding one of the stored specifications; and match data elements of different sources and determine a quality metric characterizing a given match between a first data element of a first source and a second data element of a second source according to the set of rules generated for the first source and the set of rules generated for the second source.

In another aspect, in general, a system includes: a data storage system storing a specification for each of multiple sources, each specification including information identifying one or more data elements of the corresponding source; and a data processing system coupled to the data storage system configured to generate a set of rules for each source based on a corresponding one of the stored specifications, and match data elements of different sources and determine a quality metric characterizing a given match between a first data element of a first source and a second data element of a second source according to the set of rules generated for the first source and the set of rules generated for the second source.

In another aspect, in general, a system includes: means for storing a specification for each of multiple sources, each specification including information identifying one or more data elements of the corresponding source; and means for processing data elements from the sources, including generating a set of rules for each source based on a corresponding one of the stored specifications, and matching data elements of different sources and determining a quality metric characterizing a given match between a first data element of a first source and a second data element of a second source according to the set of rules generated for the first source and the set of rules generated for the second source.

Aspects can include one or more of the following advantages.

Generally, when searching for a match between one or more key words and some text (e.g., a web page), a search process can display to a user why a given match occurred, for example, by highlighting the appearance of the key word(s) within the text (e.g., by making the key word(s) bold). In some examples, the techniques described herein may be used to identify changes in different versions of documents. Further, source or key terms may be visually linked to target terms by a relationship diagram that can include details such as matching scores and grades. When performing matches between two data elements that may represent the metadata for the same type of data, the reason why the match occurred (or did not occur) may be more complicated than the existence of an exact match between respective key words. For example, terms appearing in the data elements may have been expanded or transformed (e.g., using stemming) and relationships between matching terms may be based on finding synonyms or classifying terms into categories (called "classes"). The procedure used to perform the matching can use rules to characterize the match quality by assigning each match a grade. The grades can be stored in association with the matches to indicate the match quality.

In cases in which there are a large number of sources of metadata, differences between different sources can be accounted for so that the sources can be processed efficiently any number of times as the matching process is repeated. A pre-processing procedure enables generation of source processing information that enables processing of data elements directly from the sources by providing information needed to interpret and/or transform the data elements and information needed to define rules for characterizing the matches.

Other features and advantages of the invention will become apparent from the following description, and from the claims.

DESCRIPTION OF DRAWINGS

FIG. 5 is an exemplary output from the graph-based implementation of the automated matching process of FIG. 4.

FIGS. 6-8 are screenshots of example rules and interfaces for managing the rules.

FIGS. 9-12 are screenshots of an exemplary metadata interface.

DESCRIPTION

Business analysts may maintain multiple data dictionaries that include listings of business characteristics of data elements across many systems. Data dictionaries (or metadata repositories) are repositories of information about data such as meaning, relationships to other data, origin, usage, and format. As such, data dictionaries facilitate standardization of definitions of terms and consistency of use of these terms. In some scenarios, an enterprise wide data dictionary may be maintained to capture metadata about the data used within the enterprise.

A data element to be matched can have a name portion that identifies the data element using one or more descriptive terms, and may optionally have a description portion that describes the data element or various properties characterizing the element. The names and corresponding descriptions contained in the different dictionaries may be in a variety of formats. For example, data dictionaries may be developed at different times and as parts of different systems that may be independently maintained. For at least this reason, there may not be a commonly adopted naming standard. As such, an advantage of the metadata processing techniques described in this application is harmonization of names and descriptions across diverse data dictionaries. Additionally, by providing a quality metric or score quantifying the matches of data elements, automated metadata processing may direct a business analyst's attention to only a fraction of the matches that require human analysis. For example, the analyst may be interested in only those matches that are scored by the metric to be close matches.

Figure 1:
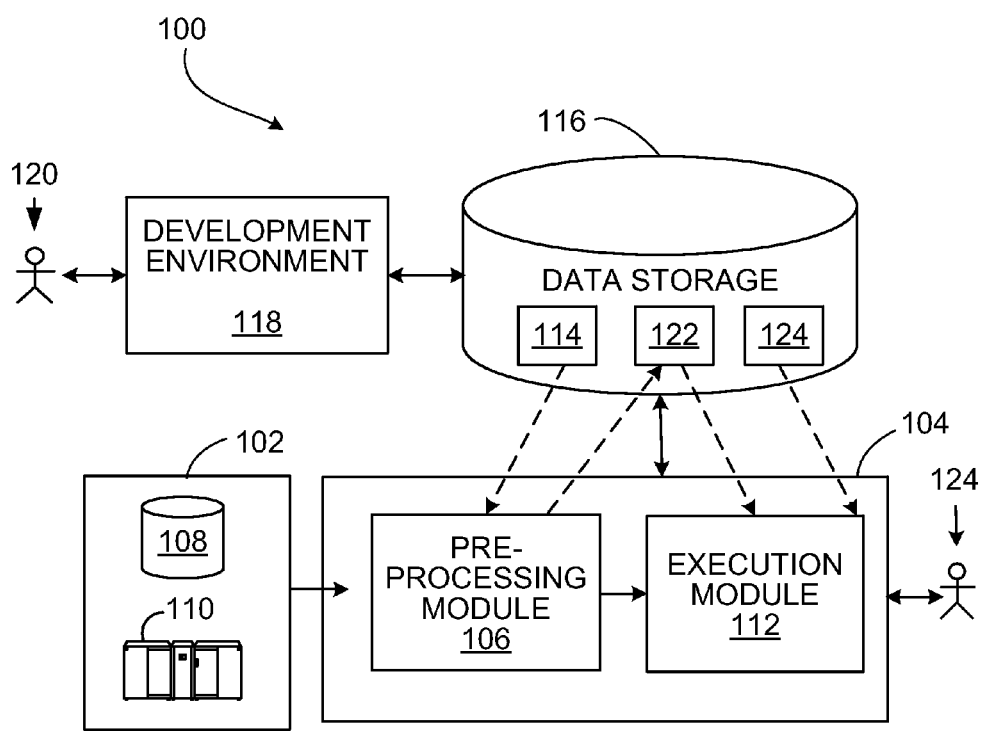
FIG. 1 is a block diagram of a system for executing graph-based computations.

FIG. 1 shows an exemplary data processing system 100 in which the metadata processing techniques can be used. The system 100 includes sources 102 that may include one or more sources of data and/or metadata such as storage devices or connections to online data streams, each of which may store data and/or metadata in any of a variety of storage formats (e.g., database tables, spreadsheet files, flat text files, or a native format used by a mainframe). In some cases, a source stores metadata independently from the data that are described by that metadata. In some cases, the metadata is stored within the same data structures as the data that are described by that metadata, or stored in association with the data using links or pointers, for example. In one example, the sources 102 are associated with multiple data storage systems that are to be integrated to form a single master data storage system. In the process of integrating the systems, it may be necessary to determine matches between metadata describing corresponding data that is to be merged. For example, it may be necessary to determine which fields from a customer list from one source store the data values representing the same attribute as fields form a customer list form another source (e.g., a "social security #" field from one source is the same attribute as a "SSN" field from another source). The matches between the data elements can then be used to integrate data storage systems. An execution environment 104 includes a pre-processing module 106 that reads the sources 102 and generates source processing information 122 for the metadata sources based on a source registry 114, and an execution module 112 that performs the metadata processing to determine matches and record quality information based on the source processing information 122 and reference information 124. A data storage system 116 stores the source registry 114, source processing information 122, and reference information 124, as described in more detail below. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof. Storage devices providing the sources 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The data storage system 116 is also accessible to a development environment 118 in which a developer 120 is able to configure the pre-processing module 106 and execution module 112. The development environment 118 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. Both the pre-processing module 106 and the execution module 112 can be configured with the ability to process multiple sources in parallel with each module implemented as a dataflow graph that receives a flow of input data from the sources 102 and provides a flow of output data, for example, as a stream of potential matches between data elements in the sources 102.

The pre-processing module 106 prepares the source processing information 122 based on information from the sources according to the source registry 114. The source registry 114 includes a specification for each source to be processed that specifies: access information indicating how to access the source, format information indicating the format of the data elements in the source, and an identification of the particular data elements in the source that are to be included in the matching process. Each specification can be stored as a row in a table, for example. The pre-processing module 106 reads the data elements from the sources indentified by the source registry 114, and generates the source processing information 122. The source processing information 122 includes any information in addition to the format information from the source registry 114 needed to interpret and/or transform the data elements to extract terms and descriptions that are to be used in the matching process. For example, a different transformation function can be stored for transforming each of a variety of formats into a common format to be used in the matching process.

The source processing information 122 also includes information needed to define rules for characterizing the matches. Some of the rules for determining grades may depend on characteristics of the data elements. So each source can have a corresponding set of rules, and together the different sets of rules can be used to determine a grade for a given match.

The execution module 112 uses the source processing information 122 generated by the pre-processing module 106 and reference information 124 stored in the data storage system 116 accessible to the execution environment 104. The execution module 112 generates words to be matched from the terms and descriptions extracted from the data elements, and performs the matching process to yield matches between data elements. The matching process includes storing data characterizing the quality of the matches, as described in more detail below. In some implementations, matching is performed between each source listed in the source registry 114 and a canonical metadata repository (CMR) stored in the data storage system 116. For example, a CMR can represent an enterprise data dictionary that is to serves as a master reference dictionary in an enterprise environment. Data elements in the source are compared with canonical attributes in the CMR to find matches.

A match between a term from a name or description or other metadata stored in a data element of a source and a term from a name or description of a canonical attribute represented in the CMR indicates that the matched data element potentially has the same meaning as the canonical attribute. In some implementations a match is determined based on a combination of matching a canonical attribute name with a data element name and matching a canonical attribute description with a data element description.

In some implementations, matching is performed such that each source is compared to all other sources in addition to the CMR to find matches between respective data elements or between a data element and a canonical attribute. In some implementations, the matching enables a comparison between sources by adding unmatched terms from a previous comparison with a source to the CMR between iterations. This process can thus obviate a need for 'all to all' processing. For example, an exemplary matching process uses the following sequence in which CMR(n) is the nth iteration of updating the CMR with selected terms from a name or description of a data element in the previous source comparison that was unmatched:

compare Source1 to CMR(0)
add all Source1 terms that are unmatched to CMR(0) creating CMR(1)
compare source2 to CMR(1)
add all Source 2 terms that are unmatched to CMR(1) creating CMR(2)
compare Source3 to CMR(2)
etc.

In one example of a matching process performed by the execution module 112, the process starts by normalizing, expanding, and cleansing terms extracted from a data element into a standard form and identifying terms that correspond to a name of an attribute defined by the metadata in a data element and terms that correspond to a description of that attribute. The cleansing may include selectively filtering certain punctuation (e.g., underbars, dashes, etc.), converting a case (e.g., to lowercase), and removing extra spaces. Lists of predetermined words (e.g., "a, also, and" etc.) including standard linguistic "nuisance words" or "stop words" can also be removed from the terms. In some implementations, the reference information 124 can include lookup files including lists of stop words, acronyms, and aliases. For example, a stop words lookup file that includes a list of stop words may be used to assist in the cleansing. Users may add or remove words from this list by modifying the lookup file. The process also includes expanding abbreviations and acronyms into fully worded phrases, and expanding terms in the name or description into common aliases. Again, an acronym lookup file can be used to assist in this process. As such, users may modify the acronym lookup file through an interface. In some examples, the interface may include controls to solicit user feedback in the approval and notification of any changes to the file.

In some implementations, a synonym lookup file may include synonyms for words in the terms and descriptions to support different words that can have similar meanings. For example, "agency", "authority", "bureau", and "organization" have similar meanings to the word "office" in a context of a particular term or description. In some examples, such synonyms can include international equivalents of certain words in the terms and descriptions. For example, "liter" may be a synonym for "liter". Additionally, the synonym lookup file may also provide support for addressing aliasing words such as "address1" and "address2" in one data source that correspond to simply "address" in a different data source. Further, some words in the terms and descriptions may be transformed to their stem forms in an effort to normalize differences between words. In some implementations, the transformations may also account for conjugations, tenses, and/or pluralities by, for example, adjusting suffixes. As an example, "acquisition" may be transformed to "acquisit" and "parameters" may be transformed to "paramet". In some implementations, a group of cleansed words is generated for the name and a group of cleansed words is generated for the description.

The process also includes determining a "class word" for each attribute. A class word is a word defines the content and role of a piece of data described by an attribute. An exemplary set of class words is: amount, code, date, time, date-time, class, description, identifier, image, indicator, name, address, number, quantity, percent, rate, sound, and text. To determine a class word for a given attribute, terms in the attribute name can be scanned from right to left to identify the first match to one of the predetermined set of class words. For example, the class word corresponding to the attribute name "start date" is "date." Some class words are determined based on words appearing in the name and/or description without necessarily requiring a match to the determined class word (e.g., an attribute Name "title" may correspond to the class word "text", "indicator", or "name", depending on terms appearing in the attribute description).

The computation of the similarity between a term and description in a source and terms and descriptions in the CMR may be performed by a modified TF-IDF process as described below. A "Term Frequency-Inverse Document Frequency" (TF-IDF) weight is a statistical measure used to evaluate how important a word in a term appearing in an attribute name or description is to a given data element and to a source of data elements. The importance of a word increases proportionally to the number of times a word appears in the data element (e.g., including the name and the description). But the importance of the word is offset by the frequency of the word in the attributes represented in the CMR.

The TF-IDF weight diminishes the weight of words that occur very frequently in the CMR and increases the weight of words that occur rarely. By way of example, consider the word "code" a common word in data dictionary terms. If the word "code" occurs in source and target terms, the match between the occurrences would not properly be explained since "code" is a common string. However, if the source and target terms both contained the term "disputed" the match between the terms is better explained, and thus the word "disputed" in both terms contributes better to facilitating a match between the two terms.

An exemplary weight vector for a "document" d (e.g., representing at least a portion of a data element from which representative terms are taken) of a set of documents D (e.g., representing a set of data elements in a source)

$$\text{is } v_d = [w_{1,d}, w_{2,d}, \ldots, w_{N,d}]^T,$$

where $$w_{t,d} = tf_t \cdot \log \frac{|D|}{|\{t \in d\}|}$$

and $tf_t$ is term frequency of term t in document d (a local parameter)

$$\log \frac{|D|}{|\{t \in d\}|}$$

is inverse document frequency (a global parameter).

|D| is the total number of documents in the document set, and |{t∈d}| is the number of documents containing the term t.

In one example, an attribute name and description contain 8 words and the word "branch" appears 2 times. The term frequency (TF) for "branch" is 0.25 (2 words of 8). In the CMR, there are ~3,300 attributes and "branch" appears in 12 of these. Then, the inverse document frequency (IDF) is calculated as ln(3,300/12)=5.61. The TF-IDF weight is the product of these quantities: 0.25*5.61=1.4. In another example, an attribute name and description contain 8 words and the word "code" appears 1 time. The TF for "code" is 0.125 (1 word of 8). In the CMR, there are ~3,300 attributes and "code" appears in 900 of these. Then, the IDF is calculated as ln(3,300/900)=1.99. The TF-IDF weight is the product of these quantities: 0.125*1.99=0.16. So, in these examples, the word "branch" with a weight of 1.4 is likely to be more important than the word "code" with a weight of 0.16.

In some implementations, the similarity between the terms and descriptions can be absolute numbers which be normalized so they range from, for example, 0 to 1. As such, for each source term, a result of the matching computation based on the modified TF-IDF approach may be a set of, e.g., N CMR terms that best match the source term in a name of an attribute and N CMR descriptions that best match the corresponding source description of the attribute. The number N may be an input parameter to the matching system. In some examples, a value of N=3 may be used.

The matching process can take into account the TF-IDF weights of words when performing matches to match words of a data element with highest weights. The matching process can use any of a variety of matching techniques for determining when words extracted from terms in the name or description match words extracted from attributes of the CMR. For example, U.S. Publication No. 2009/0182728, entitled "MANAGING AN ARCHIVE FOR APPROXIMATE STRING MATCHING," incorporated herein by reference, describes techniques for approximate string matching.

The output of the matching process include lists of data elements associated with the respective attributes in the CMR to which those data elements match. In some implementations, matches correspond to matching words in both the name and description. The output can optionally include words in the name and description that matched, and can include lists of data elements with no name or description matches.

In association with each match, the execution module 112 is able to store explanatory information including a grade characterizing the quality of the match, an explanation of how that grade was obtained (e.g., rule firing), and an explanation of why the match occurred. A grade can be determined based on a "name match" between cleansed words for a data element name and cleansed words for a canonical attribute name, a "description match" between cleansed words for a data element description and cleansed words for a canonical attribute description, and "class match" between a class word associated with a data elements and a class word associated with a canonical attribute. A metric for the match can indicate how close (e.g., with respect to a distance measure) the match is.

For example, a grade of "AA" can be assigned based on a rule that determines there was an exact name match (e.g., at least one cleansed word matches exactly), a high description match (e.g., metric >75% for a match between cleansed words), and the same class words. A grade of "AB" can be assigned based on a rule that determines there was a high name match (e.g., metric >95% for a match between cleansed words), and a high description match (e.g., metric >70% for a match between cleansed words), and the same class words. If class words are not the same, the grade is typically set much lower (e.g., "DA" and lower) since there is likely a meaningful difference in what the data described by the data element represents.

The execution environment 104 also includes a user interface to allow a user 124 interact with the output of the matching process to review and accept matches based on the associated grades and other information. The user interface can include a list of data elements that include terms in the name and/or description that matched to a term in a canonical attribute or another data element, and the list can include links to the original data elements in the sources or to copies of the original data elements. In some implementations, matches are accepted based on comparisons of grades to thresholds without requiring user input. Unmatched data elements can be reviewed and used to update the reference information 124 based on user input. For example, a user can review terms of art or unexpanded acronyms for addition to a reference containing synonyms or a reference containing expansions of acronyms, respectively.

Figure 2:
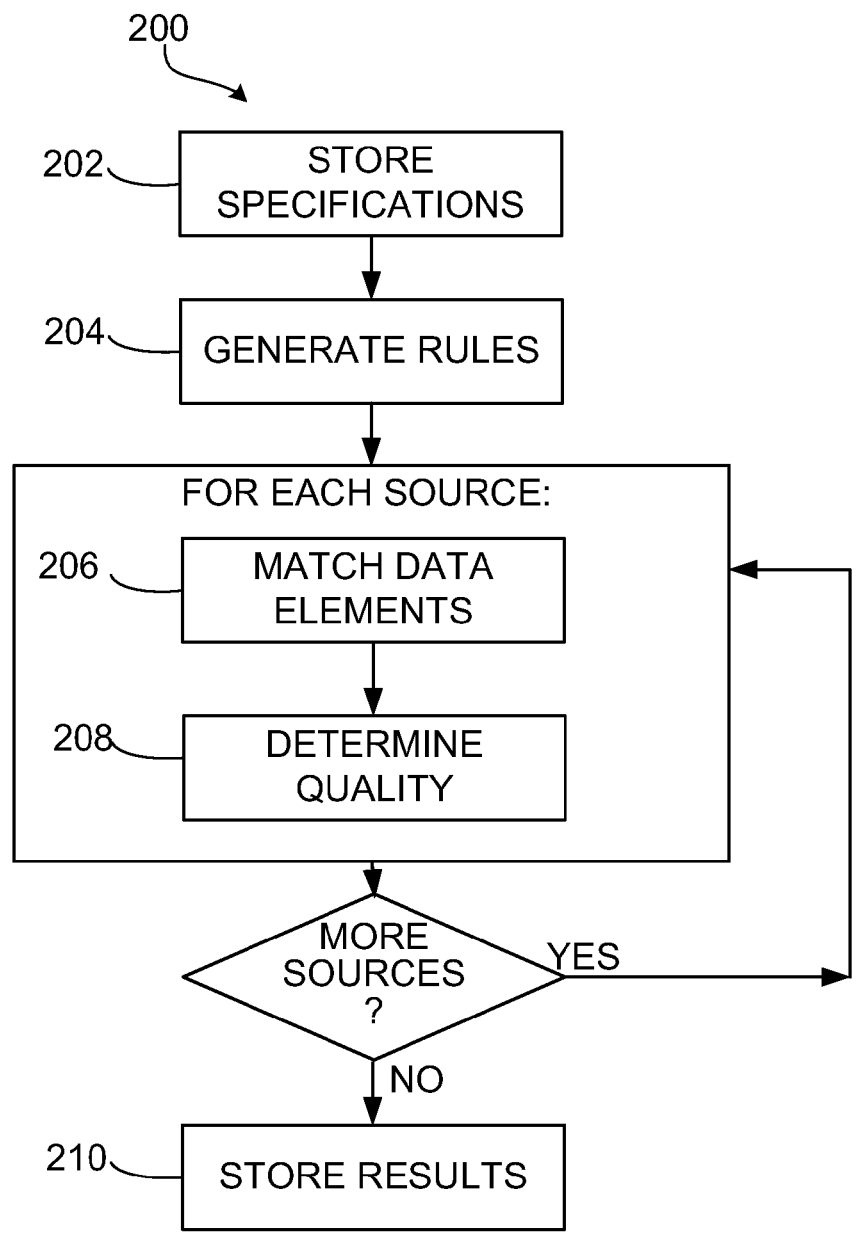
FIG. 2 is a flowchart of an exemplary metadata processing procedure.

FIG. 2 shows a flowchart for an exemplary procedure 200 for pre-processing the metadata from the sources 102 and executing the matching on the metadata. The procedure 200 includes storing (202), in the data storage system 116, a specification for each of multiple sources 102, each specification including information identifying one or more data elements of the corresponding source. The procedure 200 includes processing, in a data processing system providing the execution environment 104 coupled to the data storage system 116, data elements from the sources. The processing includes generating (204) a set of rules for each source based on a corresponding one of the stored specifications, and matching (206) data elements of different sources and determining (208) a quality metric (e.g., grades) characterizing a given match between a first data element of a first source and a second data element of a second source according to the set of rules generated for the first source and the set of rules generated for the second source. After the sources are processed, results are stored (210) identifying the determined matches. As additional sources are added, the procedure 200 can be repeated, processing the additional sources.

Figure 3:
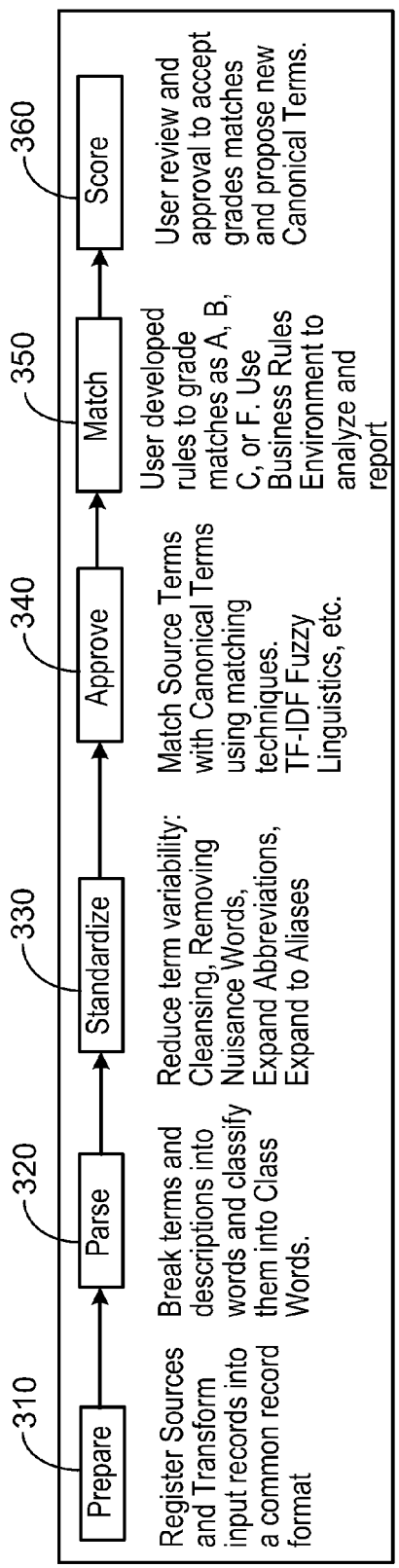
FIG. 3 shows phases of an exemplary automated matching process.

FIG. 3 shows example phases of an automated matching process performed by a data processing system (e.g., system 100 shown in FIG. 1) in which a source (e.g., a source data dictionary) is matched against a CMR (e.g., an enterprise dictionary). For example, the CMR may be compiled from a variety of sources over a period of time.

During a prepare phase 310, the information in the source data dictionary may be converted into a format that is compatible with the metadata processing techniques described above. For example, pre-processing module 106 (FIG. 1) may be used in this phase to map source data structures to a common record format.

In an implementation of the prepare phase 310, the system may accept input from a user to generate a data structure for a particular source and register a corresponding source data dictionary in a registration form. Subsequently, the registration form may be read and the source data dictionary may be converted into a format that is compatible with the matching system. For example, in a graph-based system, a "Generate Metadata" dataflow graph may be run to load the source data dictionary. The graph may read the registration form and generate metadata that is used in the matching process. In some implementations, the graph may also generate sets of parameters for configuring additional dataflow graphs and rule files for configuring a rules engine for loading business terms, descriptions, acronyms, and links corresponding to the source data dictionary. Once the metadata and the parameter sets and rule files are generated a matching dataflow graph can be run. In some examples, more than one source dictionary can be run through the "Generate graph" simultaneously.

During a parse phase 320, the terms in the source dictionary can be processed to extract individual words. As described in connection with the cleansing process above, punctuation without semantic meaning may be removed from the terms. In some implementations, certain characters such as "$" and "%" can be left within the terms because they may have semantic meaning. In some implementations, the terms can further be classified into class words as described above.

During a standardize phase 330, variability in terms and descriptions can be reduced. In this phase, the terms and descriptions can be further cleansed to remove, for example, stop words, expand abbreviations, and map aliases. During an approve phase 340 the source terms may be matched with canonical terms using one or more matching techniques. For example, a TF-IDF weight as described above can be used to evaluate how important a word in a term or description is to a given data element and to a source of data elements. In some examples, a "fuzzy matching" technique may be employed to perform the matching process (e.g., as described in U.S. Publication No 2009/0182728, incorporated herein by reference).

Once the weights are assigned, one or more user developed rules can be used to grade the matches during the match phase 350. For example, the matches may be graded as described above. In one implementation, grades such as "A", "B", "C" or "F" may be assigned to matches depending on the quality of the match, where "A" may be a grade specifying a highest quality match, and "F" may be a grade specifying a poorest quality match. Finally, during a score phase 360, a user may review and accept the matches based on grades assigned to the matches. In some implementations, the user may also propose new canonical terms for the CMR.

Figure 4:
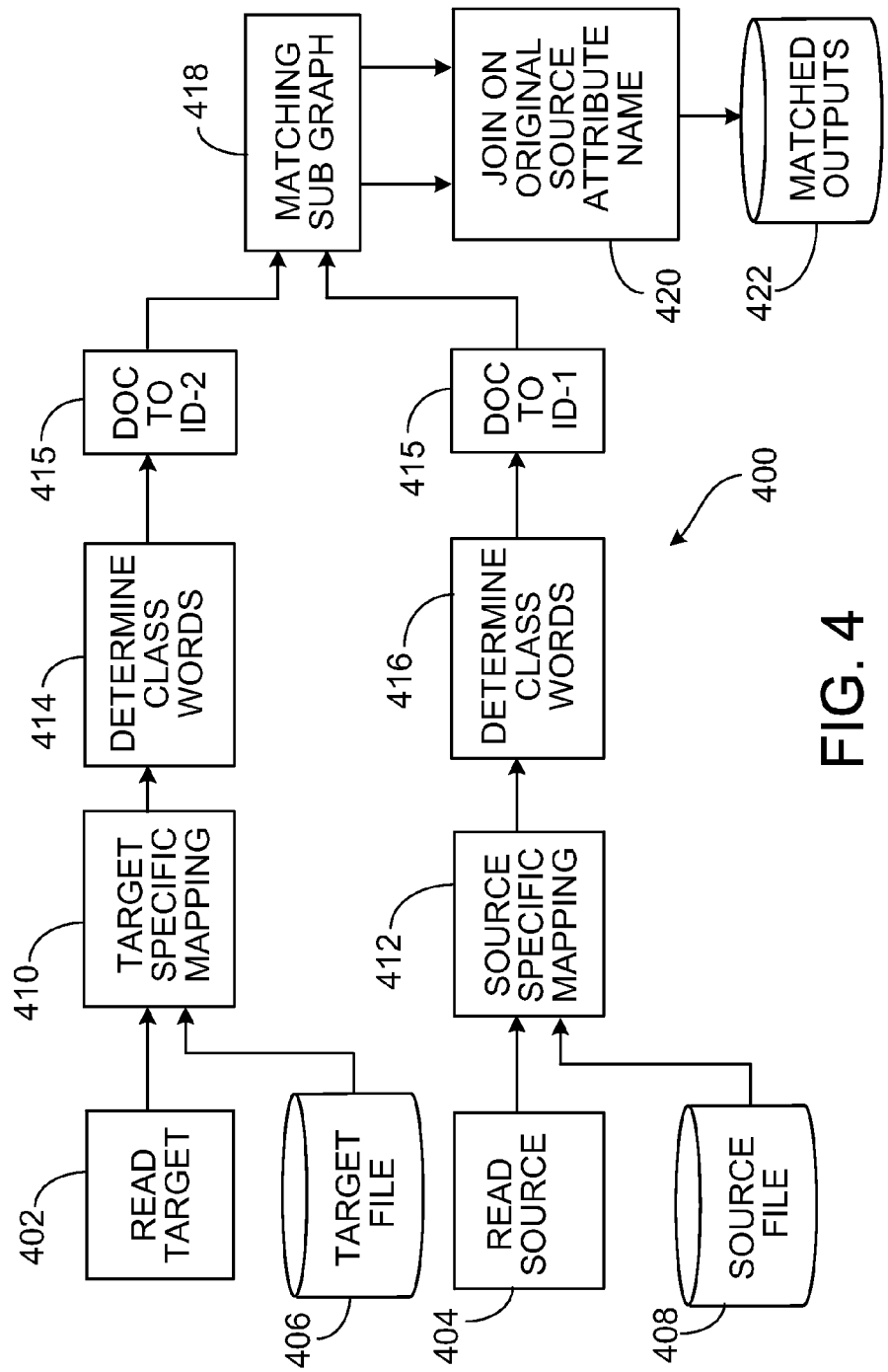
FIG. 4 is an exemplary graph-based implementation of an automated matching process.

FIG. 4 shows an example graph-based approach for implementing the matching technique described above. The matching graph 400 may be called by, for example, the "Generate Metadata" graph described above once the source data is ready for matching. As such, a read target component 402 and a read source component 404 begin the matching process by reading corresponding target and source files 406, 408 respectively. The target file 406 may include CMR terms and descriptions from the CMR. Subsequently, a mapping components 410, 412 may perform target and source specific mapping processes on the terms and descriptions in the target and source files respectively. For example, multiple instances and variations of certain terms and descriptions may be mapped together by the mapping components 410, 412. As such, the process allows for a source term to be matched against multiple targets with match scores for each match so that a user using the workflow can support a process to determine the 'best' match.

Subsequently, using the classification process described in detail above, the classification components 414, 416 may determine class words for the terms and descriptions in the target and source files 406, 408. In some situations, matching terms using string text can be computationally slow. As such, text terms can be converted, i.e., tokenized, to numeric keys and thus dramatically speed up the matching process. For example, components 415 may perform this conversion on source and target terms. At the conclusion of the matching the keys may be decoded back to the original text terms. Once the source and target terms and descriptions are mapped and standardized, a matching subgraph 418 performs the matching of the words in the terms and descriptions in the source with the words in the terms and descriptions in the target. For words that match in the source and target, the matching subgraph 418 can return the term or description with an accompanying quality metric indicating the closeness of the match. The join component 420 can perform a join using a source attribute name derived from an original source of the particular term or description and output the results as matched outputs 422.

An example output 500 of the graph 400 of FIG. 4 is shown in FIG. 5. As shown, a source term "milestone identifier" 502 corresponds to at least three CMR terms (or any user-specified number of 'best matches'), namely, "milestone name", "milestone identifier" and "milestone date" 504. Quality metrics 506 quantify the degree of similarity of the source term with each of the CMR terms. For example, the similarity measure for the second item in the output, "milestone identifier" is 1, indicating a perfect match. In implementations, the best three term matches of the term "milestone identifier" 502 can be joined with best three description matches, and the nine term/description communications can be sent to a set of business rules that to decide a best match between the source and CMR terms.

In some examples, the business rules can be based on similarity of the term name and description matches as well as computed class words for the source and CMR terms as described in detail above. In some implementations, an output of the business rules is a best match as well as a letter grade for that match. Users may set a predetermined quality of the match to correspond to the letter grades. Further, users may specify a predetermined range of accepted grades. For example, a user may only accept match quality that corresponds with grades A through BC (or B minus).

FIG. 6 shows example business rules 600 used in a matching processing. Triggers 602 act as inputs to the business rules 600, which produce corresponding outputs 604 as shown. Similarity measures such as a similarity of names between source and CMR terms may be quantified as a numeric value ranging from 0 to 1. As such, a first business rule 606 can be interpreted as follows: If a similarity of names between source and CMR terms is greater than 0.95, a similarity of descriptions between the source and CMR description is greater than 0.70, the names of the two terms are identical, and the class words corresponding to the two terms are the same, then the match grade between the two terms is an "AA" (or "A plus"). In some examples, if any of the triggers 602 in the business rule above evaluate to false, then a second business rule 608 is read, which states as follows: If the similarity of names between the source and CMR terms is greater than 0.95, the similarity of descriptions between the source and CMR descriptions is greater than 0.70, the names of the two terms are not identical, and the class words corresponding to the two terms are the same, then the match grade between the two terms is an "AB" (or "A minus"). In examples, the business rules 600 are read one after the other until a business rule is read where all of the input triggers evaluate to true. A user may define a minimum grade that is triggered by the business rules 600.

Figure 7:
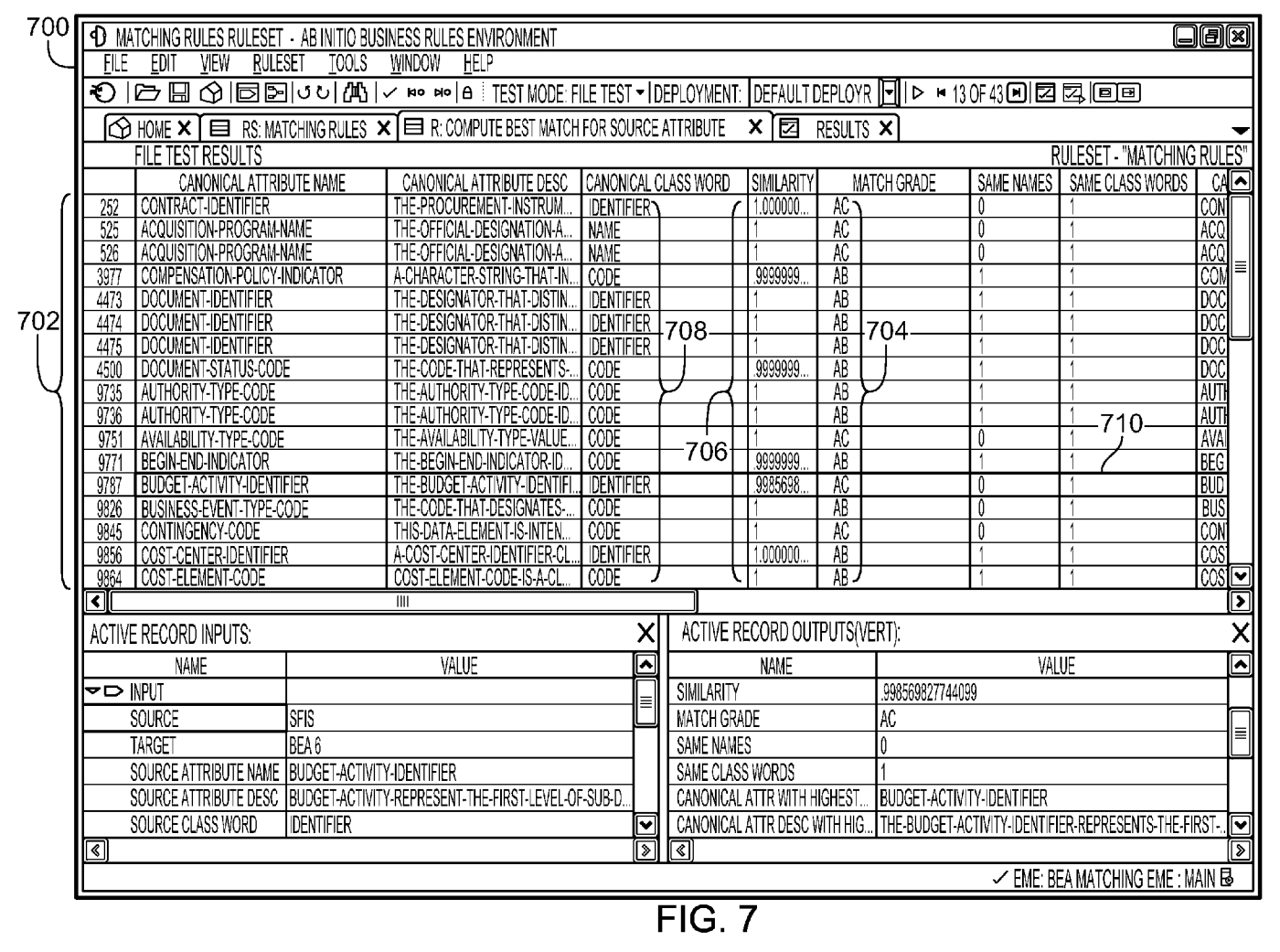

In some implementations, an analyst may be able to perform test runs of the business rules 600 by using test data. FIG. 7 is a screenshot 700 of an example test run. As shown, for each of the test data items 702, a match grade 704 is generated and displayed to the analyst. In addition, similarity scores 706 and class word matches 708 are displayed corresponding to each item 702. The analyst can select a test item 710, which is then highlighted and, thus can view more information about the item 710.

Figure 8:
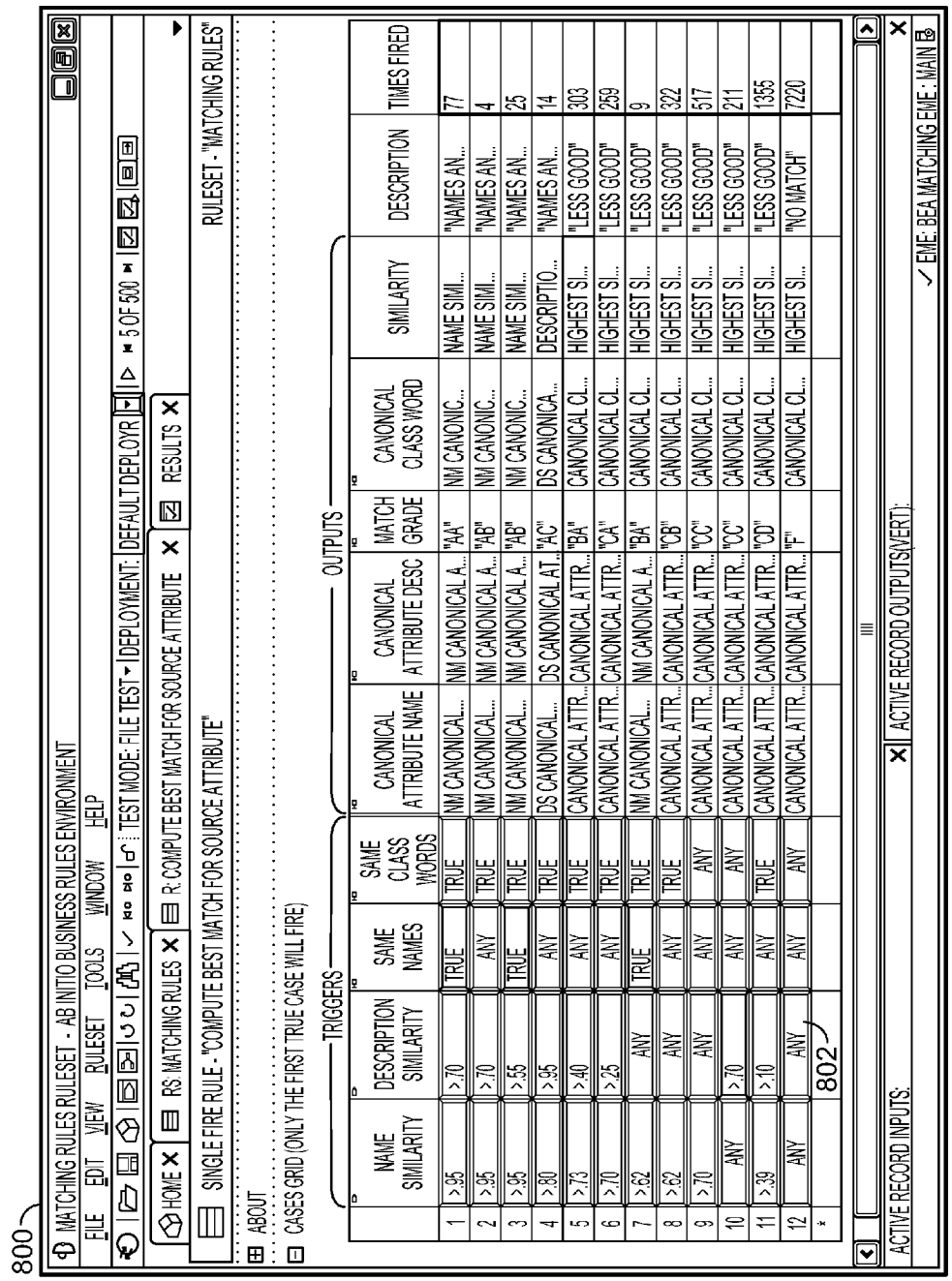
Figure 9:
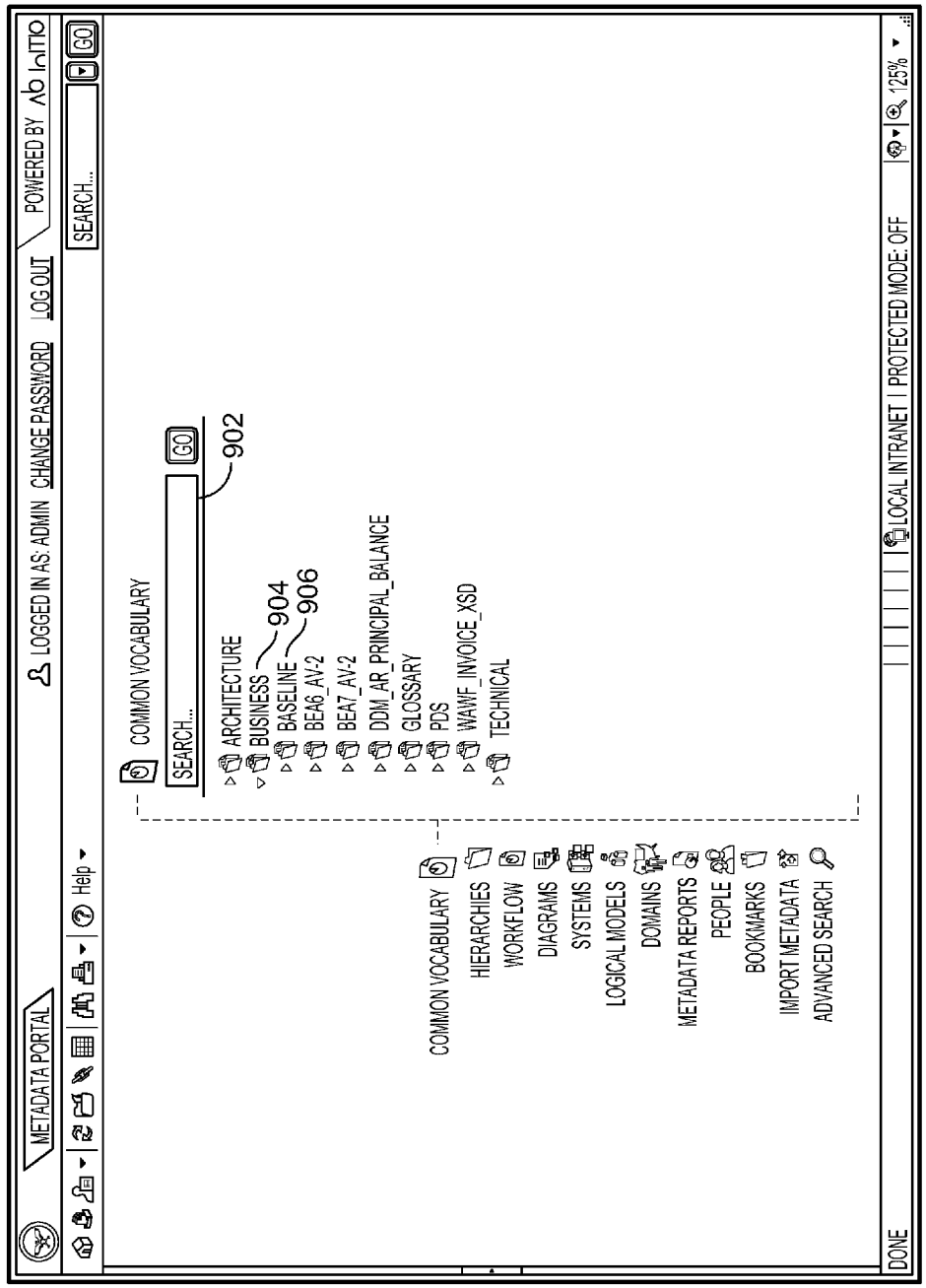

FIG. 8 is an example screenshot 800 showing exactly which rule fired for a particular test data item (e.g., item 702 of FIG. 7). In addition, an analyst may also view information about how many times a business rule (e.g., one of rules 600 of FIG. 6) fired. As shown, in some implementations, one or more graphical buttons 802 may be used to indicate whether a trigger corresponding to a button 802 evaluated to true. The buttons corresponding to rule 5 are all depressed indicating that rule 5 has fired for a particular test data. Further, a number of times each rule has fired may be displayed. For example, rule 1 has fired 77 times while rule 5 has fired 303 times. This approach, termed a rapid 'iterative test, modify, and rerun" approach, may be used to optimize the matching rules. An analyst can use such an interface to see if there are terms that were inappropriately matched.

FIGS. 9-12 are screenshots of an example metadata interface 900 for displaying metadata information to a user. In some implementations, the results of the matching process (e.g., matched outputs 422 of FIG. 4) can be incorporated into the interface 900. As shown in FIG. 6, the interface 900 can provide a text-field 902 for searching the metadata repository. The terms may be further stored as hierarchical groups (e.g., "Business" 904) and child groups (e.g., "Baseline" 906).

Figure 10:
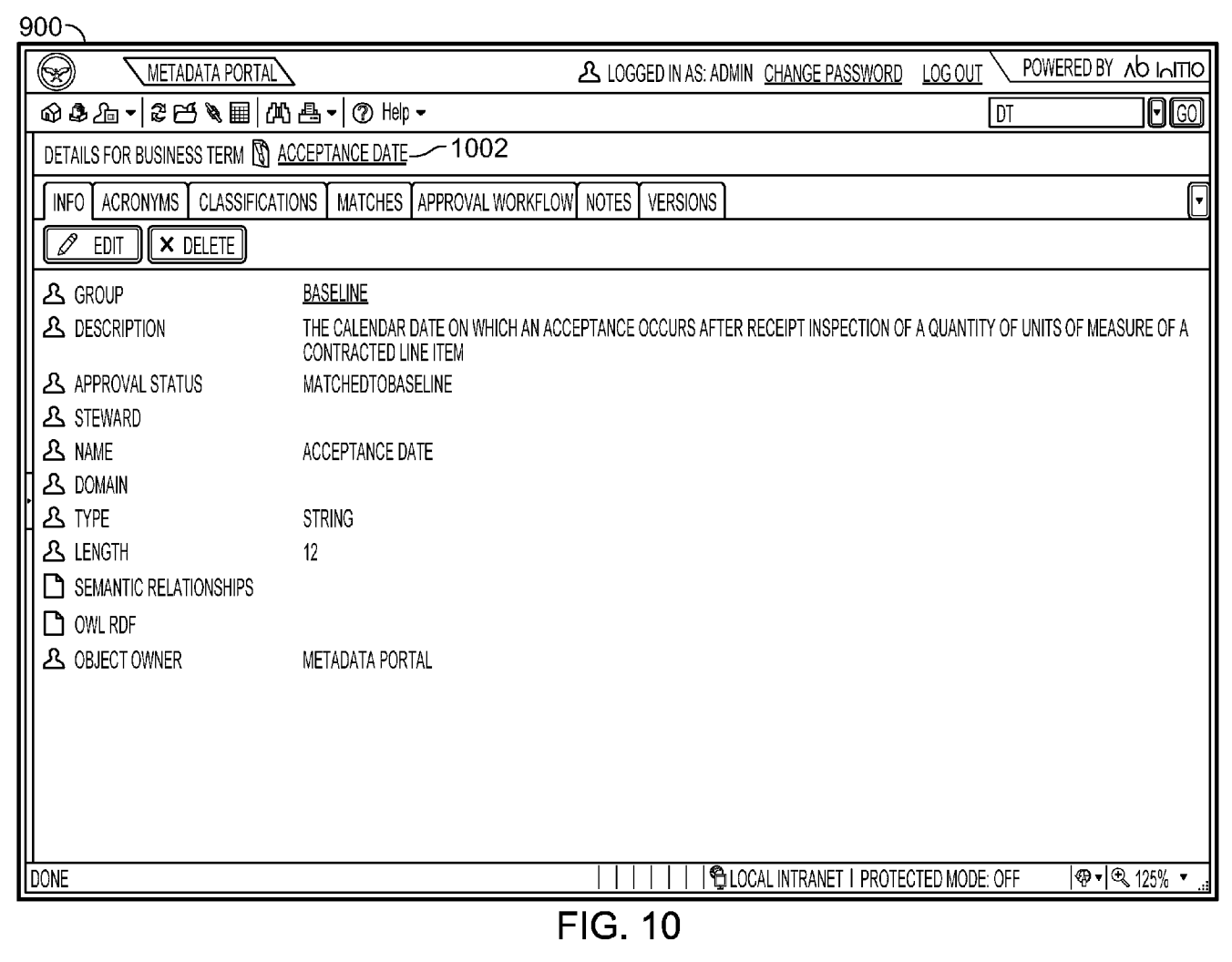

FIG. 10 shows the interface 900 displaying details of a term "acceptance date" 1002 belonging to the "Baseline" 906 group. In some implementations, a user may right click on the term "acceptance rate" 1002 and request to see relationships pertaining to the term "acceptance rate" 1002.

Figure 11:
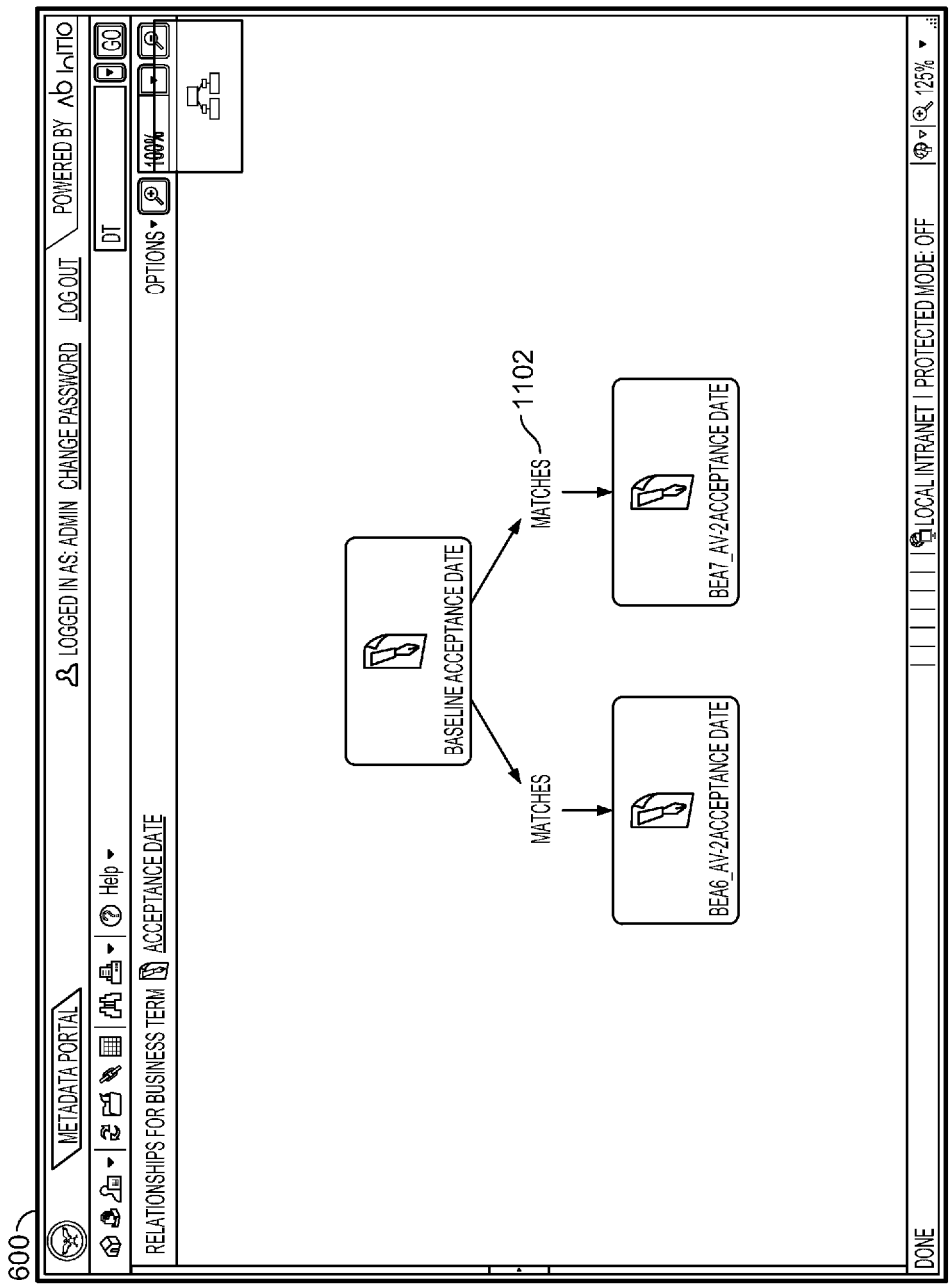

FIG. 11 shows a diagrammatic representation 1102 of the matches to the Baseline term "acceptance date" 1002. In some examples, information about the source of the matches can also be displayed to the user.

Referring now to FIG. 12, in some implementations, a tabular view of the matches may be available to the user. The interface 900 can be configured to display only approved matches. A user may use the "approval workflow" tab 1202 to review matches including pending and/or rejected matches for the terms.

The metadata processing approach described above can be implemented using software for execution on a computer. In some implementations, the process may automate the matching process for an unlimited number of dictionaries in a very short run. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A system including:
   a data storage system storing a specification for each of multiple sources, each specification including information identifying one or more data elements of the corresponding source; and
   a data processing system that communicates with the data storage system configured to process data elements of the sources, including:
      identify terms and associated descriptions in a first source,
      for each term in the first source, identify a first predetermined number of terms in a second source that are most similar to the term in the first source, and identify a second predetermined number of term descriptions that are the most similar to the term description in the first source, and
      for each term in the first source, apply one or more rules to evaluate quality of matches between the term in the first source and the terms in the second source, in which each rule evaluates a similarity between the term of the first source and the term in the second source, and evaluate a similarity between the term description of the first source and the term description of the second source.

2. The system of claim 1 in which each rule assigns a grade level to a match between the term and associated description in the first source and the term and associated description in the second source.

3. The system of claim 2 in which the data processing system is further configured to identify matches having grade levels below a threshold level.

4. A method including:
   storing, in a data storage system, a specification for each of multiple sources, each specification including information identifying one or more data elements of the corresponding source; and
   processing, in a data processing system that communicates with the data storage system, data elements of the sources, including:
      identifying terms and associated descriptions in a first source,
      for each term in the first source, identifying a first predetermined number of terms in a second source that are most similar to the term in the first source, and identifying a second predetermined number of term descriptions that are the most similar to the term description in the first source,
      for each term in the first source, applying one or more rules to evaluate quality of matches between the term in the first source and the terms in the second source, in which each rule evaluates a similarity between the term of the first source and the term in the second source, and evaluates a similarity between the term description of the first source and the term description of the second source.

5. The method of claim 4 in which each rule assigns a grade level to a match between the term and associated description in the first source and the term and associated description in the second source.

6. The method of claim 5, further including identifying matches having grade levels below a threshold level.

7. A non-transitory computer-readable medium storing a computer program, the computer program including instructions for causing a computer to:
   store a specification for each of multiple sources, each specification including information identifying one or more data elements of the corresponding source; and
   process data elements of the sources, including:
      identify terms and associated descriptions in a first source,
      for each term in the first source, identify a first predetermined number of terms in a second source that are most similar to the term in the first source, and identify a second predetermined number of term descriptions that are the most similar to the term description in the first source, and
      for each term in the first source, apply one or more rules to evaluate quality of matches between the term in the first source and the terms in the second source, in which each rule evaluates a similarity between the term of the first source and the term in the second source, and evaluate a similarity between the term description of the first source and the term description of the second source.

8. The non-transitory computer-readable medium of claim 7 in which each rule assigns a grade level to a match between the term and associated description in the first source and the term and associated description in the second source.

9. The non-transitory computer-readable medium of claim 7, further including identifying matches having grade levels below a threshold level.

10. A system including:
- means for storing a specification for each of multiple sources, each specification including information identifying one or more data elements of the corresponding source; and
- means for processing data elements from the sources, the processing including
  - identifying terms and associated descriptions in a first source,
  - for each term in the first source, identifying a first predetermined number of terms in a second source that are most similar to the term in the first source, and identifying a second predetermined number of term descriptions that are the most similar to the term description in the first source, and
  - for each term in the first source, applying one or more rules to evaluate quality of matches between the term in the first source and the terms in the second source, in which each rule evaluates a similarity between the term of the first source and the term in the second source, and evaluates a similarity between the term description of the first source and the term description of the second source.

11. A system including:
- a data storage system storing a specification for each of multiple sources, each specification including information identifying one or more data elements of the corresponding source; and
- a data processing system that communicates with the data storage system configured to process data elements of the sources, including:
  - identify pairs of data elements, each pair of data elements including a data element from a first source and a data element from a second source, each data element being associated with a name and a description,
  - for each pair of data elements, compute a first similarity value representing a similarity of the names associated with the pair of data elements, and compute a second similarity value representing a similarity of the descriptions associated with the pair of data elements, and
  - apply one or more rules to each pair of at least some of the pairs of data elements, each rule evaluating a quality of match between the pair of data elements, including comparing the first similarity value to a first threshold value and comparing the second similarity value to a second threshold value.

12. The system of claim 11 in which compute similarity values for data elements of first and second sources includes compute similarity values for cleansed or standardized data elements of first and second sources, and
evaluating a quality of match between a first data element of the first source and a second data element of the second source includes evaluating a quality of match between a first cleansed or standardized data element of the first source and a second cleansed or standardized data element of the second source.

13. The system of claim 11 in which the data processing system is further configured to cleanse or standardize the data elements prior to computing similarity values for the data elements.

14. The system of claim 11 in which when a rule is applied to a pair of data elements, the rule assigns a grade level to a match between the pair of data elements based on a comparison of a first similarity value to a first threshold value and a comparison of a second similarity value to a second threshold value.

15. The system of claim 12 in which the data processing system is configured to, for each data element in the first source, identify a first predetermined number of names in the second source that are the most similar to the name of the data element in the first source, and identifying a second predetermined number of descriptions that are the most similar to the description of the data element in the first source.

16. The system of claim 15, including for each data element in the first source, applying rules to the name and the description of the data element in the first source, each of the first predetermined number of names in the second source, and each of the second predetermined number of descriptions in the second source,
in which each rule evaluates a match between the name of the data element in the first source and one of the first predetermined number of names in the second source, and/or a match between the description of the data element in the first source and one of the second predetermined number of descriptions in the second source.

17. The system of claim 16 in which each rule assigns a grade level to a match between a name and description in the first source and a name and description in the second source.

18. The system of claim 17, further including identifying matches having grade levels below a threshold level.

19. The system of claim 12 in which each data element is associated with a class word, and the method includes for each pair of data elements, computing a third similarity value representing a similarity of the class words associated with the pair of data elements.

20. A method including:
- storing, in a data storage system, a specification for each of multiple sources, each specification including information identifying one or more data elements of the corresponding source; and
- processing, in a data processing system that communicates with the data storage system, data elements of the sources, including:
  - identifying pairs of data elements, each pair of data elements including a data element from a first source and a data element from a second source, each data element being associated with a name and a description,
  - for each pair of data elements, computing a first similarity value representing a similarity of the names associated with the pair of data elements, and computing a second similarity value representing a similarity of the descriptions associated with the pair of data elements, and
  - applying one or more rules to each pair of at least some of the pairs of data elements, each rule evaluating a quality of match between the pair of data elements, including comparing the first similarity value to a first threshold value and comparing the second similarity value to a second threshold value.

21. The method of claim 20 further including:
classifying terms appearing in the pair of data elements into one or more classes; and
assigning one or more class words for each of the terms in the pair of data elements;
wherein computing the similarity values includes comparing the one or more class words corresponding to terms in the pair of data elements respectively.

22. The method of claim 20 wherein a first grade is assigned to an output of a first rule and a second grade is assigned to a second, different output of a second rule, wherein the first grade indicates a better quality metric characterizing the match relative to the second grade.

23. The method of claim 20 in which the processing includes:
providing a first weight to terms from names or descriptions that occur with a first frequency in the first or second source; and
providing a second weight to terms from names or descriptions that occur with a second frequency in the first or second source, wherein a value of the first weight is less than a value of the second weight;
wherein computing the first and second similarity values takes into account of the weights associated with the terms.

24. The method of claim 20 in which the processing includes:
computing a first frequency of terms in the first source and a second frequency of terms in the second source; and
producing a quality metric based on a product of numerical values of the first and second frequencies.

25. The method of claim 20 in which computing the first and second similarity values for data elements of first and second sources includes computing similarity values for cleansed or standardized data elements of first and second sources, and
evaluating a quality of match between a first data element of the first source and a second data element of the second source includes evaluating a quality of match between a first cleansed or standardized data element of the first source and a second cleansed or standardized data element of the second source.

26. The method of claim 20 in which the processing includes cleansing or standardizing the data elements prior to computing similarity values for the data elements.

27. The method of claim 20 in which when a rule is applied to a pair of data elements, the rule assigns a grade level to a match between the pair of data elements based on a comparison of a first similarity value to a first threshold value and a comparison of a second similarity value to a second threshold value.

28. The method of claim 27, further including identifying pairs of data elements for which the grade level assigned to the match of each of the pairs of data elements is below a threshold level.

29. The method of claim 20, further including for each data element in the first source, identifying a first predetermined number of names in the second source that are the most similar to the name of the data element in the first source, and identifying a second predetermined number of descriptions that are the most similar to the description of the data element in the first source.

30. The method of claim 29, including for each data element in the first source, applying rules to the name and the description of the data element in the first source, each of the first predetermined number of names in the second source, and each of the second predetermined number of descriptions in the second source,
in which each rule evaluates a match between the name of the data element in the first source and one of the first predetermined number of names in the second source, and/or a match between the description of the data element in the first source and one of the second predetermined number of descriptions in the second source.

31. The method of claim 30 in which each rule assigns a grade level to a match between a name and description in the first source and a name and description in the second source.

32. The method of claim 31, further including identifying matches having grade levels below a threshold level.

33. The method of claim 20 in which each data element is associated with a class word, and the method includes for each pair of data elements, computing a third similarity value representing a similarity of the class words associated with the pair of data elements.

34. The method of claim 33 in which each rule evaluates a quality of match between the pair of data elements by also comparing the third similarity value to a third threshold value, and assigning a grade level to the match also based on the third threshold value.

35. The method of claim 34, further including identifying pairs of data elements for which the grade level assigned to the match of each of the pairs of data elements is below a threshold level.

36. A non-transitory computer-readable medium storing a computer program, the computer program including instructions for causing a computer to:
store a specification for each of multiple sources, each specification including information identifying one or more data elements of the corresponding source; and
process data elements of the sources, including:
identify pairs of data elements, each pair of data elements including a data element from a first source and a data element from a second source, each data element being associated with a name and a description,
for each pair of data elements, compute a first similarity value representing a similarity of the names associated with the pair of data elements, and computing a second similarity value representing a similarity of the descriptions associated with the pair of data elements, and
apply one or more rules to each pair of at least some of the pairs of data elements, each rule evaluating a quality of match between the pair of data elements, including comparing the first similarity value to a first threshold value and comparing the second similarity value to a second threshold value.

37. The non-transitory computer-readable medium of claim 36 in which process data elements includes:
classify terms appearing in the first and second data elements into one or more classes; and
assign one or more class words for each of the terms in the first and second data elements;
wherein compute the similarity values includes compare the one or more class words corresponding to terms in the pair of data elements respectively.

38. The non-transitory computer-readable medium of claim 36 in which a first grade is assigned to an output of a first rule and a second grade is assigned to a second, different output of a second rule, wherein the first grade indicates a better quality metric characterizing the match relative to the second grade.

39. The non-transitory computer-readable medium of claim 36 in which process data elements includes:
providing a first weight to terms from names or descriptions that occur with a first frequency in the first or second source; and
providing a second weight to terms from names or descriptions that occur with a second frequency in the first or second source, wherein a value of the first weight is less than a value of the second weight;
wherein computing the first and second similarity values takes into account of the weights associated with the terms.

40. The non-transitory computer-readable medium of claim 36 in which process data elements includes:
computing a first frequency of terms in the first source and a second frequency of terms in the second source; and
producing a quality metric based on a product of numerical values of the first and second frequencies.

41. The computer-readable medium of claim 36 in which compute similarity values for data elements of first and second sources includes compute similarity values for cleansed or standardized data elements of first and second sources, and
evaluate a quality of match between a first data element of the first source and a second data element of the second source includes evaluate a quality of match between a first cleansed or standardized data element of the first source and a second cleansed or standardized data element of the second source.

42. The computer-readable medium of claim 36 in which the computer program further includes instructions for causing the computer to cleanse or standardize the data elements prior to computing similarity values for the data elements.

43. The non-transitory computer-readable medium of claim 36 in which when a rule is applied to a pair of data elements, the rule assigns a grade level to a match between the pair of data elements based on a comparison of a first similarity value to a first threshold value and a comparison of a second similarity value to a second threshold value.

44. The non-transitory computer-readable medium of claim 43, further including instructions for causing the computer to identify pairs of data elements for which the grade level assigned to the match of each of the pairs of data elements is below a threshold level.

45. The non-transitory computer-readable medium of claim 36, further including instructions for causing the computer to, for each data element in the first source, identify a first predetermined number of names in the second source that are the most similar to the name of the data element in the first source, and identify a second predetermined number of descriptions that are the most similar to the description of the data element in the first source.

46. The non-transitory computer-readable medium of claim 45, including instructions for causing the computer to, for each data element in the first source, apply rules to the name and the description of the data element in the first source, each of the first predetermined number of names in the second source, and each of the second predetermined number of descriptions in the second source,
in which each rule evaluates a match between the name of the data element in the first source and one of the first predetermined number of names in the second source, and/or a match between the description of the data element in the first source and one of the second predetermined number of descriptions in the second source.

47. The non-transitory computer-readable medium of claim 46 in which each rule assigns a grade level to a match between a name and description in the first source and a name and description in the second source.

48. The non-transitory computer-readable medium of claim 47, further including instructions for causing the computer to identify matches having grade levels below a threshold level.

49. The non-transitory computer-readable medium of claim 36 in which each data element is associated with a class word, and the medium further includes instructions for causing the computer to, for each pair of data elements, compute a third similarity value representing a similarity of the class words associated with the pair of data elements.

50. The non-transitory computer-readable medium of claim 49 in which each rule evaluates a quality of match between the pair of data elements by also comparing the third similarity value to a third threshold value, and assigning a grade level to the match also based on the third threshold value.

51. The non-transitory computer-readable medium of claim 50, further including instructions for causing the computer to identify pairs of data elements for which the grade level assigned to the match of each of the pairs of data elements is below a threshold level.

52. A system including:
means for storing a specification for each of multiple sources, each specification including information identifying one or more data elements of the corresponding source; and
means for processing data elements from the sources, the processing including
identifying pairs of data elements, each pair of data elements including a data element from a first source and a data element from a second source, each data element being associated with a name and a description,
for each pair of data elements, computing a first similarity value representing a similarity of the names associated with the pair of data elements, and computing a second similarity value representing a similarity of the descriptions associated with the pair of data elements, and
applying one or more rules to each pair of at least some of the pairs of data elements, each rule evaluating a quality of match between the pair of data elements, including comparing the first similarity value to a first threshold value and comparing the second similarity value to a second threshold value.

* * * * *

UNITED STATES PATENT AND TRADEMARK OFFICE
CERTIFICATE OF CORRECTION

| | |
|---|---|
| PATENT NO. | : 9,031,895 B2 |
| APPLICATION NO. | : 13/005981 |
| DATED | : May 12, 2015 |
| INVENTOR(S) | : Andrew Schon |

Page 1 of 1

It is certified that error appears in the above-identified patent and that said Letters Patent is hereby corrected as shown below:

Claims

Col. 16, Line 4, claim 15, delete "claim 12" and insert -- claim 11 --.

Col. 16, Line 28, claim 19, delete "claim 12" and insert -- claim 11 --.

Col. 19, Line 7, claim 41, delete "computer-readable" and insert -- non-transitory computer-readable --.

Col. 19, Line 17, claim 42, delete "computer-readable" and insert -- non-transitory computer-readable --.

Signed and Sealed this
Fifteenth Day of September, 2015

Michelle K. Lee
*Director of the United States Patent and Trademark Office*